United States Patent
Goodwin, III

(10) Patent No.: US 7,406,693 B1
(45) Date of Patent: Jul. 29, 2008

(54) METHOD OF CONTROLLING APPLICATIONS

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 595 days.

(21) Appl. No.: 09/950,116

(22) Filed: Sep. 10, 2001

(51) Int. Cl.
G06F 9/54 (2006.01)
G06F 15/16 (2006.01)

(52) U.S. Cl. .................. 719/313; 719/328; 719/330; 709/203; 709/218

(58) Field of Classification Search .............. 719/328, 719/330, 310, 313; 709/203, 218; 707/1
See application file for complete search history.

(56) References Cited

U.S. PATENT DOCUMENTS

| | | | | |
|---|---|---|---|---|
| 5,680,549 A * | 10/1997 | Raynak et al. | ............ | 709/227 |
| 5,682,534 A * | 10/1997 | Kapoor et al. | ............ | 719/328 |
| 5,692,129 A * | 11/1997 | Sonderegger et al. | ... | 707/103 R |
| 5,761,071 A * | 6/1998 | Bernstein et al. | ............ | 700/237 |
| 5,802,299 A * | 9/1998 | Logan et al. | ............ | 709/218 |
| 5,956,483 A * | 9/1999 | Grate et al. | ............ | 709/203 |
| 6,119,166 A * | 9/2000 | Bergman et al. | ............ | 709/232 |
| 6,195,694 B1 * | 2/2001 | Chen et al. | ............ | 709/220 |
| 6,437,803 B1 * | 8/2002 | Panasyuk et al. | ............ | 715/733 |
| 6,546,554 B1 * | 4/2003 | Schmidt et al. | ............ | 717/176 |
| 6,687,762 B1 * | 2/2004 | Van Gaasbeck et al. | ..... | 719/319 |
| 6,718,399 B1 * | 4/2004 | Chernick et al. | ............ | 719/330 |
| 7,007,278 B2 * | 2/2006 | Gungabeesoon | ............ | 719/311 |
| 2003/0055876 A1 * | 3/2003 | Korala et al. | ............ | 709/203 |
| 2003/0163448 A1 * | 8/2003 | Kilemba et al. | ............ | 707/1 |

OTHER PUBLICATIONS

M. Condict, et al, "Optimizing Performance of Mach-Based Systems by Server Co-Location: A Detailed Design", OSF Research Institute, Aug. 24, 1993.*
M. Hasan, et al, "Browsing Local and Remote Information", CASCON '95, 1995.*
P. Corcoran, et al, "Browser-Style Interfaces to a Home Automation Network", IEEE, 1997, pp. 1063-1069.*
J. Wu, "Business Intelligence: Differences between Web and Non-Web Applications", DM Review Online, Mar. 2000.*

* cited by examiner

Primary Examiner—Li B Zhen
(74) Attorney, Agent, or Firm—Paul W. Martin

(57) ABSTRACT

A method controlling an application from a web page. The method includes the steps of recording activation of an interface button associated with the application on the web page, determining whether the application is already active, and calling the application if the application is not already active. The method further includes the step of passing command line parameters to the application if the application is a non-web application.

2 Claims, 3 Drawing Sheets

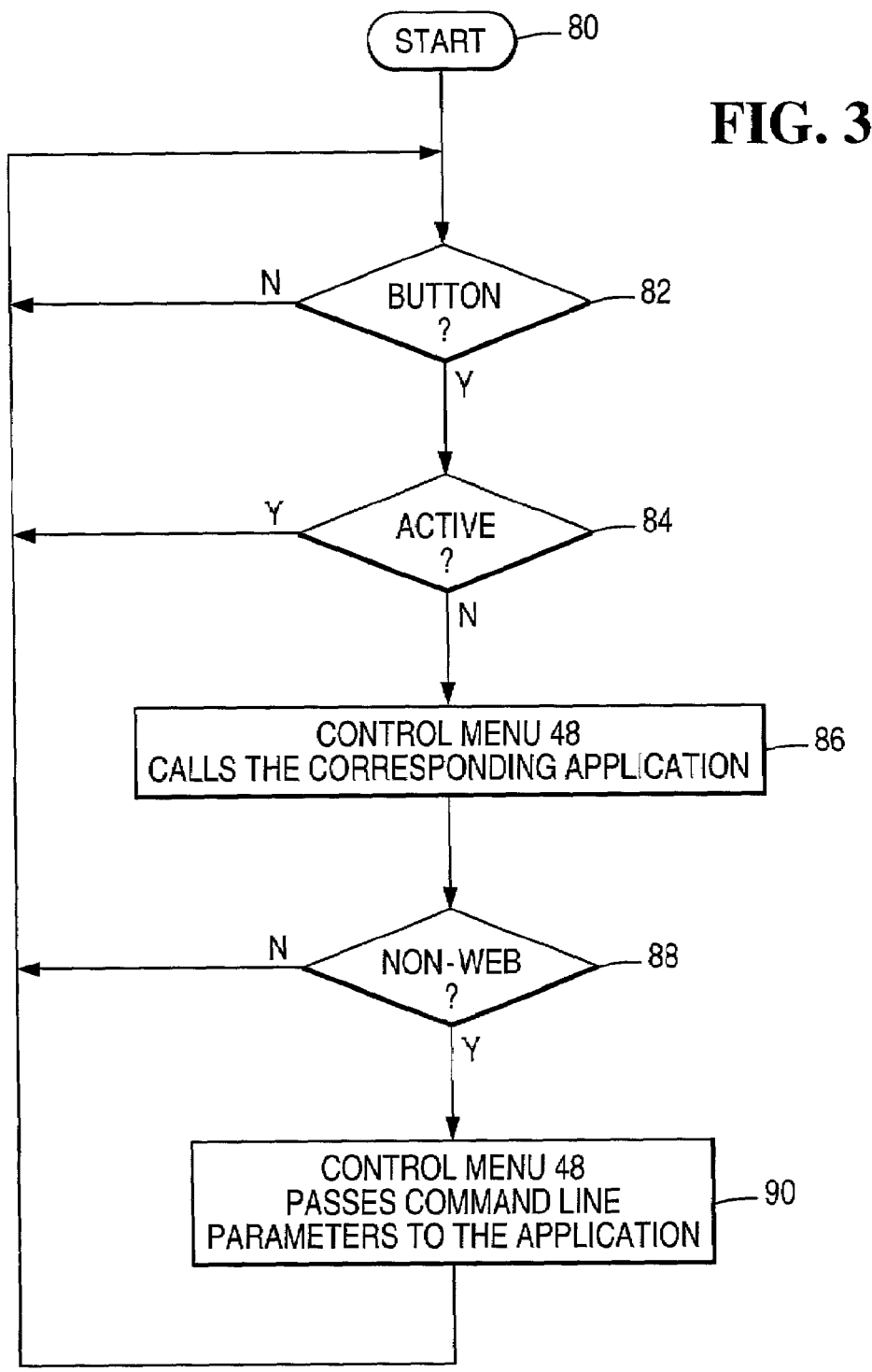

METHOD OF CONTROLLING APPLICATIONS

BACKGROUND OF THE INVENTION

The present invention relates to self-service kiosks and more specifically to a method of controlling applications.

Retailers have a desire to sell their products over networks, such as global networks which are a part of the World Wide Web (WWW or "web") and which use the Transmission Control Protocol/Internet Protocol (TCP/IP protocol). These retailers wish to provide Internet server web sites which offer the same features as Internet server web sites available to home shoppers who use their computers to connect to the Internet server web sites.

Kiosks provide a publicly-accessible computing platform for displaying web pages and other web-delivered content from retailer web sites. Kiosks may be located within a retailer's transaction establishment or elsewhere, such as in shopping malls. Kiosks may be easily networked to retailer web sites using the TCP/IP protocol. Web pages from web sites may be displayed using known and available web software, such as Microsoft® Internet Explorer software.

Kiosk owners may wish to integrate web applications with non-web applications on the same kiosk, where non-web applications typically include Microsoft Visual Basic applications, Microsoft Visual C applications, Microsoft Visual C++ applications, and host character based applications (e.g., VT100 emulation used locally). However, integration is difficult. To port all applications to the same technology costs lots of time and money.

Therefore, it would be desirable to provide a method of controlling applications which allows web and non-web applications to run together on the same kiosk.

SUMMARY OF THE INVENTION

In accordance with the teachings of the present invention, a method of controlling applications is provided.

The method includes the steps of recording activation of an interface button associated with an application on the web page, determining whether the application is already active, and calling the application if the application is not already active.

The method further includes the step of passing command line parameters to the application if the application is a non-web application.

It is a feature of the present invention that web applications and non-web applications may be launched from a control menu in a web page. The control menu includes interface buttons for calling the web and non-web applications.

It is accordingly an object of the present invention to provide a method of controlling applications.

It is another object of the present invention to control execution of both web and non-web applications.

It is another object of the present invention to control execution of both web and non-web applications using a control menu.

It is another object of the present invention to allow a plurality of non-web applications to run at the same time on a kiosk.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating operation of the control menu.

DETAILED DESCRIPTION OF THE PREFERRED EMBODIMENT

Figure 1:
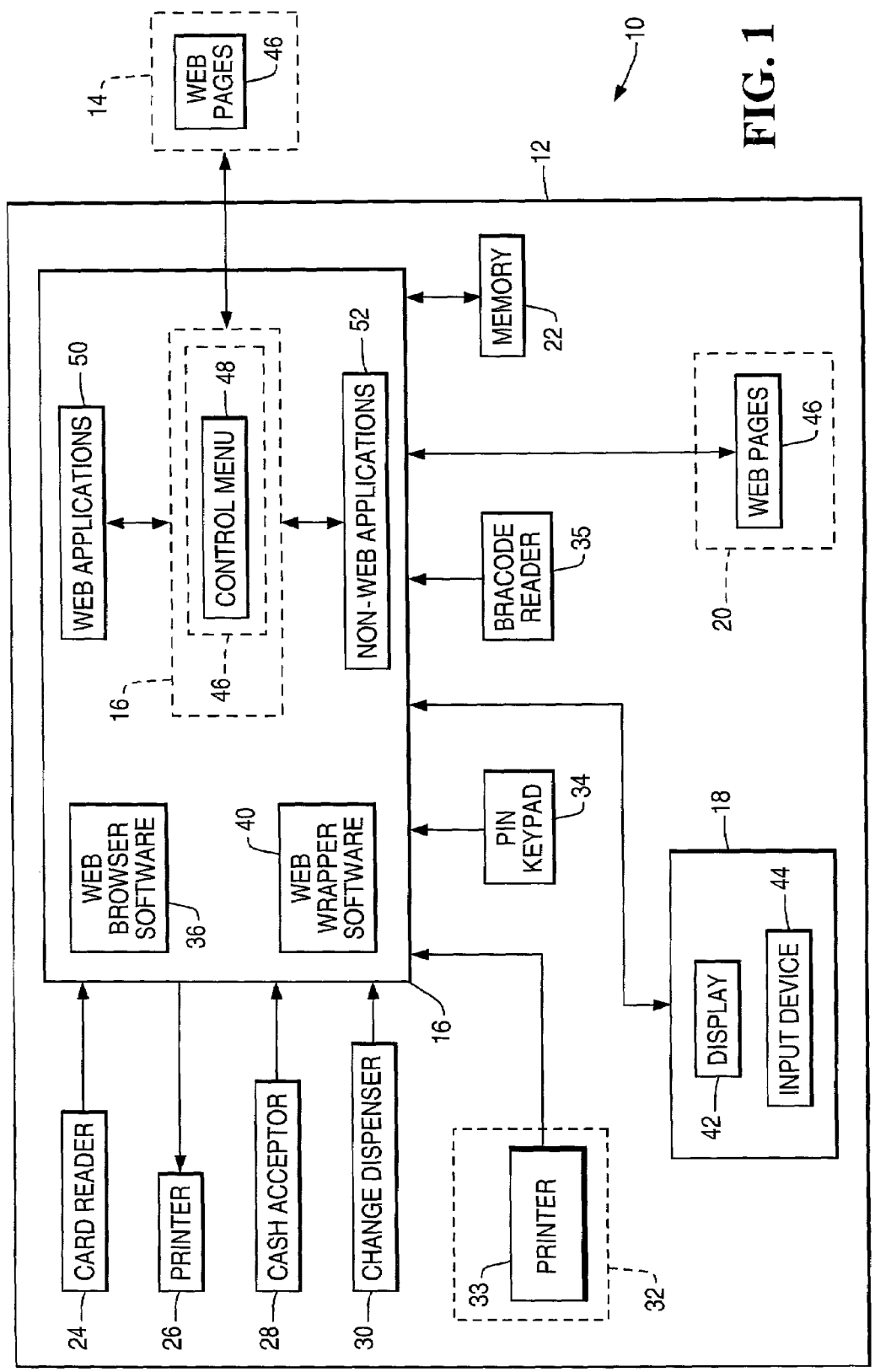
FIG. 1 is a block diagram of a kiosk system.

Turning now to FIG. 1, system 10 includes kiosk 12 and server 14. Kiosk 12 is preferably located in a store or other public place. Kiosk 12 may include an NCR 7401 computer.

Kiosk 12 primarily includes processor 16, touch screen 18, memory 22, and storage medium 20. Kiosk 12 may additionally includes a number of peripherals suited to its purpose, such as card reader 24, printer 26, cash acceptor 28, cash dispenser 30, check reader 32, and personal identification number (PIN) keypad 34.

An example purpose for kiosk 12 is to record purchases of items. For this purpose, processor 16 executes transaction application 38, which displays instructions for completing purchases of items, records customer selections of items, records payment via card reader 24, cash acceptor 28, or check reader 32, and dispenses change through cash dispenser 30.

In order to take cash or check payments, transaction application 38 must also provide balancing functions, just like a point-of-sale terminal. This helps the kiosk owner create its deposit slip and balance the kiosk.

Transaction application 38 displays a web page 46 which includes control menu 48 Control menu 48 executes web applications 50 and non-web applications 52. Control menu 48 is a web application itself, which uses various technologies, such as hypertext markup language (HTML), Java, and Java script (J-Script) to call web applications 50 and non-web applications 52. Web applications 50 and non-web applications 52 must provide a method of exiting, such as an exit button or a timeout period, to return control to control menu 48.

Control menu 48 uses startup command line parameters to control execution of non-web applications 52 so that non-web applications 52 can run at the same time as web applications 50 and other non-web applications 52. Startup parameters are listed in Table 1 below.

TABLE 1

| Parameter | Definition |
|---|---|
| -a | The application starts without running the application level attract loop. The application returns control to control menu 48 after termination. |
| -s | The application saves its current state when terminating so that the user may be returned to the termination point the next time the application is called. |
| -i | The application initializes and returns control to control menu 48 without terminating in order to save time the next time the application is called by control menu 48. |
| -q | The application restarts. |

Transaction application 38 may be resident on server 14 and be executed by processor 16 over a network connection, such as one which uses the TCP/IP protocol. Kiosk 12 may be connected to the World Wide Web (web) and may obtain web content from web servers. Web servers may include both in-store and external servers.

Processor 16 also executes web browser software 36 and web wrapper software 40.

Web browser software 36 allows an operator to display information in a format established by the World Wide Web (WWW or "web"). Transaction application 38 may be written as a web application which displays transaction information in the form of web pages 46, although transaction application 38 may also be a non-web application and operate without web browser software 36 and web wrapper software 40. Web pages 46 may be written using hypertext markup language (HTML) or other suitable web page language.

Web browser software 36 may include commercially available web browser software, such as Microsoft® Internet Explorer web browser software. Microsoft® Internet Explorer web browser software is configured into a kiosk operation using a "-k" command line option. This option hides toolbars and menu bars to prevent operator access to those functions.

Web browser software 36 may also display a start or "home" page within web pages 46 which operates as a default page from which kiosk operation begins and to which operation returns when an operator is finished using kiosk 12. Web browser software 36 may also facilitate purchase of goods from retailers and may also serve to display advertisement when not in use.

Web wrapper software 40 provides security functions. During operation, web wrapper software 40 prevents an operator from accessing kiosk files, or other applications, or the operating system software, or basic input-output system (BIOS) firmware, and prevents the operator from causing kiosk 12 to reboot.

Touch screen 18 includes display 42 and input device 44. Display 42 and input device 44 may also be separate units. Input device 44 may record selection information from a customer.

Storage medium 20 stores web pages 46 for use by transaction application 38 and other applications. Some of web pages 46 may be obtained from server 14. Storage medium 20 also stores item configuration file 50.

Memory 22 is used by processor 16 to store executed program information.

Card reader 24 reads loyalty, credit, debit, SMART, and/or other types of cards carried by a customer. Card reader 24 may record payment information from a customer.

Printer 26 prints receipt information.

Cash acceptor 28 accepts cash in multiple denominations.

Cash dispenser 30 dispenses change.

Check reader 32 reads checks and includes a magnetic ink character (MICR) reader. Check reader 32 also includes printer 33 for printing information on checks.

PIN keypad 34 records PIN numbers for debit card transactions.

Kiosk 12 may additionally include barcode reader 35, which may be used to scan barcode labels on in-stock versions of items.

Server 14 may be an external web server or in-store web server. Server 14 receives a list of purchased items and payment information for the items from transaction application 38.

Figure 2:
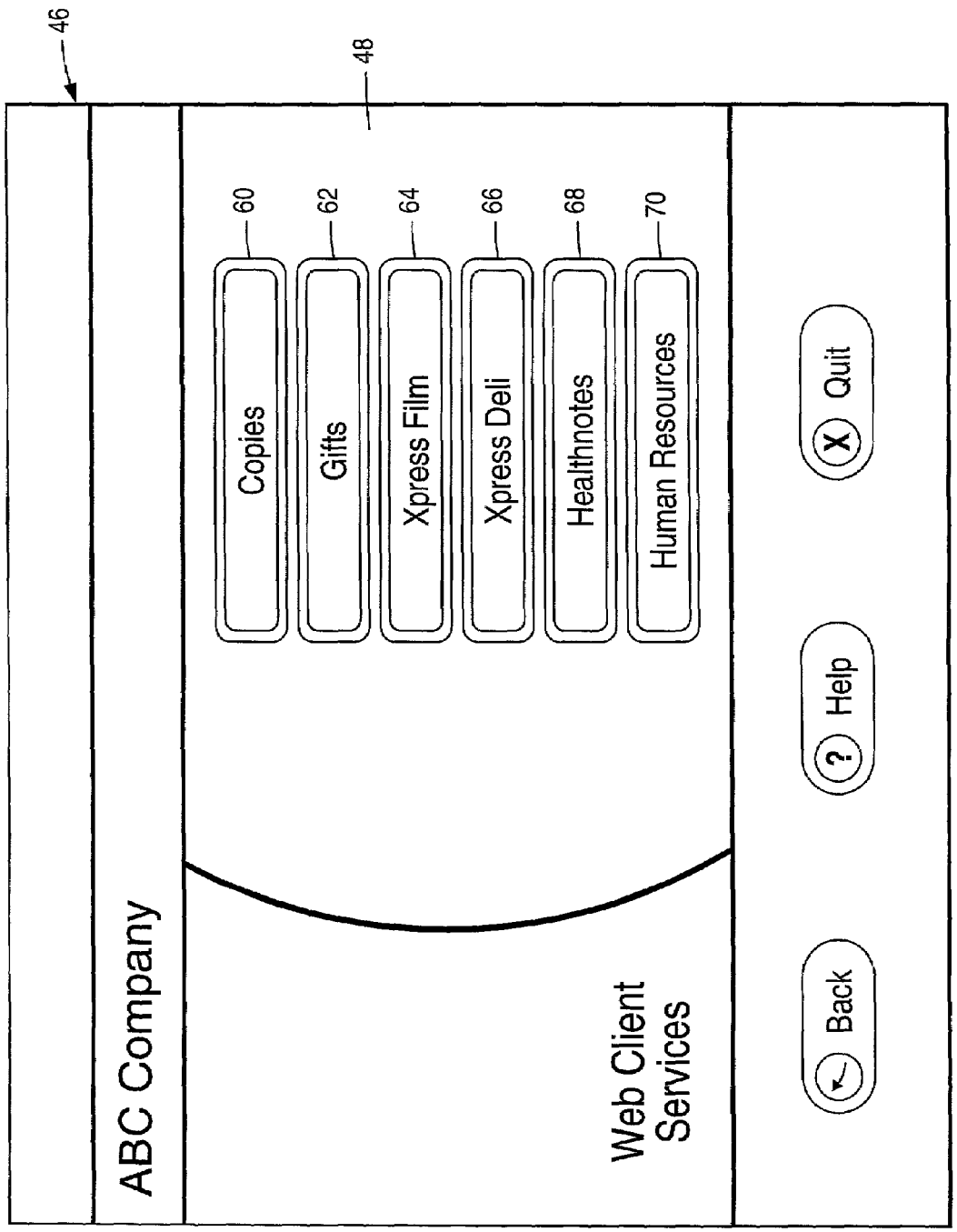
FIG. 2 illustrates a control menu.

Turning now to FIG. 2, an example control menu 48 is shown. Control menu 48 includes interface buttons 60-70 which call corresponding applications, which may include web applications 50 and non-web applications 52. Each interface button 60-70 is tailored to the type of application being called through the use of startup command line parameters in Table 1.

Turning now to FIG. 3, operation of control menu 48 is illustrated in detail beginning with START 80.

In step 82, control menu 48 waits for activation of one of interface buttons 60-70.

In step 84, control menu 48 determines whether the application is already active. If not, operation proceeds to step 86. Otherwise, operation returns to step 82.

In step 86, control menu 48 calls a corresponding application.

In step 88, operation proceeds to step 90 if the application is one of non-web applications 52 or step 82 if the application is one of web applications 50.

In step 90, control menu 48 passes command line parameters to the application. The application operates until the user exits, after which control menu 48 may launch the application again.

Operation returns to step 82.

Advantageously, multiple non-web applications 52 may be operational at the same time as web applications 50. Web applications 50 and non-web applications 52 must provide a method of exiting, such as an exit button or a timeout period, to return control to corresponding interface buttons 60-70. Each non-web application 52 may have its own way of ceasing execution.

Although the present invention has been described with particular reference to certain preferred embodiments thereof, variations and modifications of the present invention can be effected within the spirit and scope of the following claims.

I claim:

1. A method of controlling an application by a web kiosk comprising the steps of:

executing a transaction application for recording purchases of items over a network from the web kiosk by a user, including displaying a transaction web page by the web kiosk;

executing a control menu web application in the transaction web page including interface buttons associated with a resident first web application and a resident second non-web application by the web kiosk;

recording user activation of a first interface button of the control menu web application associated with the first web application by the web kiosk;

determining whether the first web application is already active by the web kiosk;

calling the first web application if the first web application is not already active by the web kiosk;

executing the first web application by the web kiosk regardless of whether another application is already active;

recording user activation of a second interface button of the control menu web application associated with the second non-web application by the web kiosk;

determining whether the second non-web application is already active by the web kiosk;

calling the second non-web application if the second non-web application is not already active by the web kiosk;

passing a command line parameter to the second non-web application that returns control to the control menu web application by the web kiosk;

executing the second non-web application by the web kiosk regardless of whether the first web application is already active; and returning control to the control menu by the web kiosk following execution of the first web application and the second non-web application.

2. A web kiosk comprising:

a touch screen;

a storage medium storing executable instructions for controlling an application;

a processor that executes the instructions to perform the steps of:

executing a transaction application for recording purchases of items by a user over a network, including displaying a transaction web page;

executing a control menu web application in the transaction web page including interface buttons associated with a resident first web application and a resident second non-web application;

recording user activation of a first interface button of the control menu web application associated with the first web application;

determining whether the first web application is already active;

calling the first web application if the first web application is not already active;

executing the first web application regardless of whether another application is already active;

recording user activation of a second interface button of the control menu web application associated with the second non-web application;

determining whether the second non-web application is already active;

calling the second non-web application if the second non-web application is not already active;

passing a command line parameter to the second non-web application that returns control to the control menu web application;

executing the second non-web application regardless of whether the first web application is already active; and returning control to the control menu following execution of the first web application and the second non-web application.

* * * * *